INVENTOR.
ROBERT M. ZIEGENMEYER

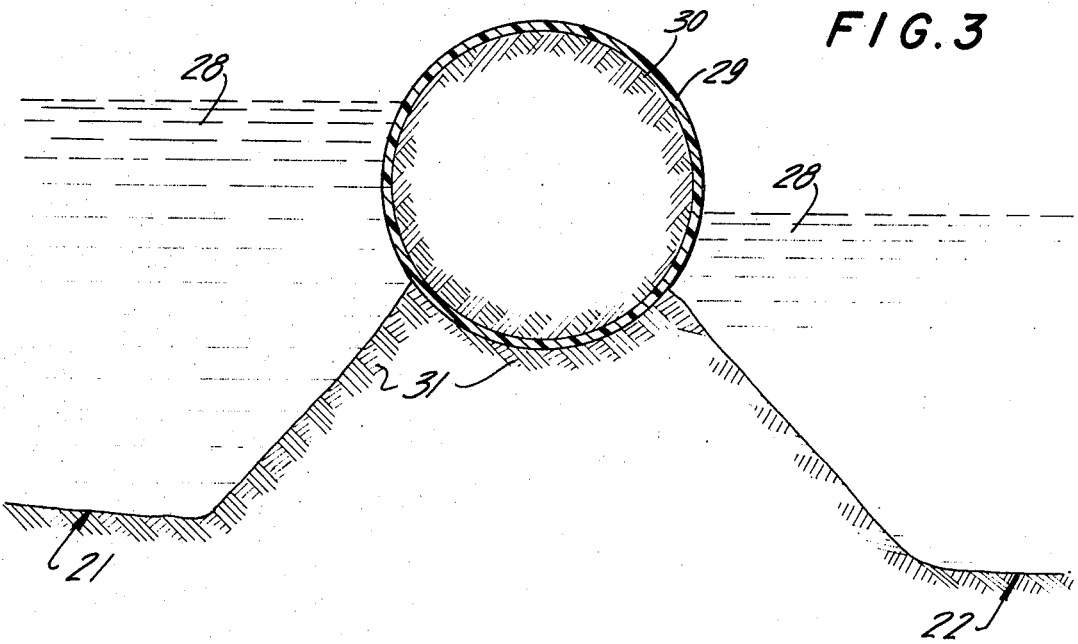
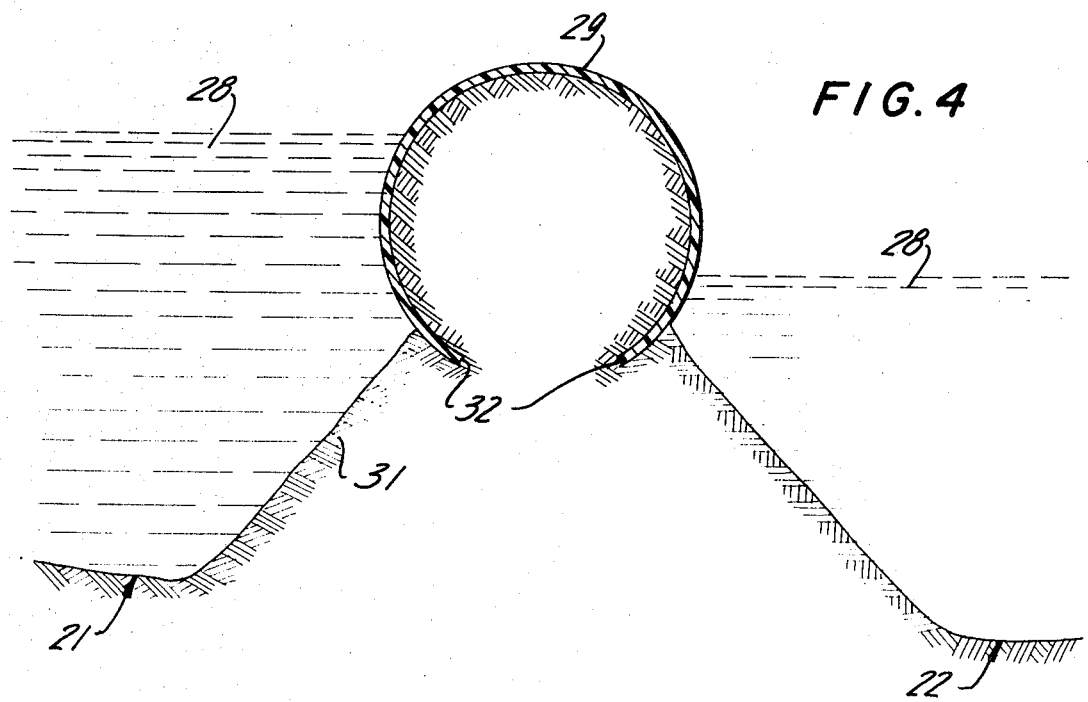

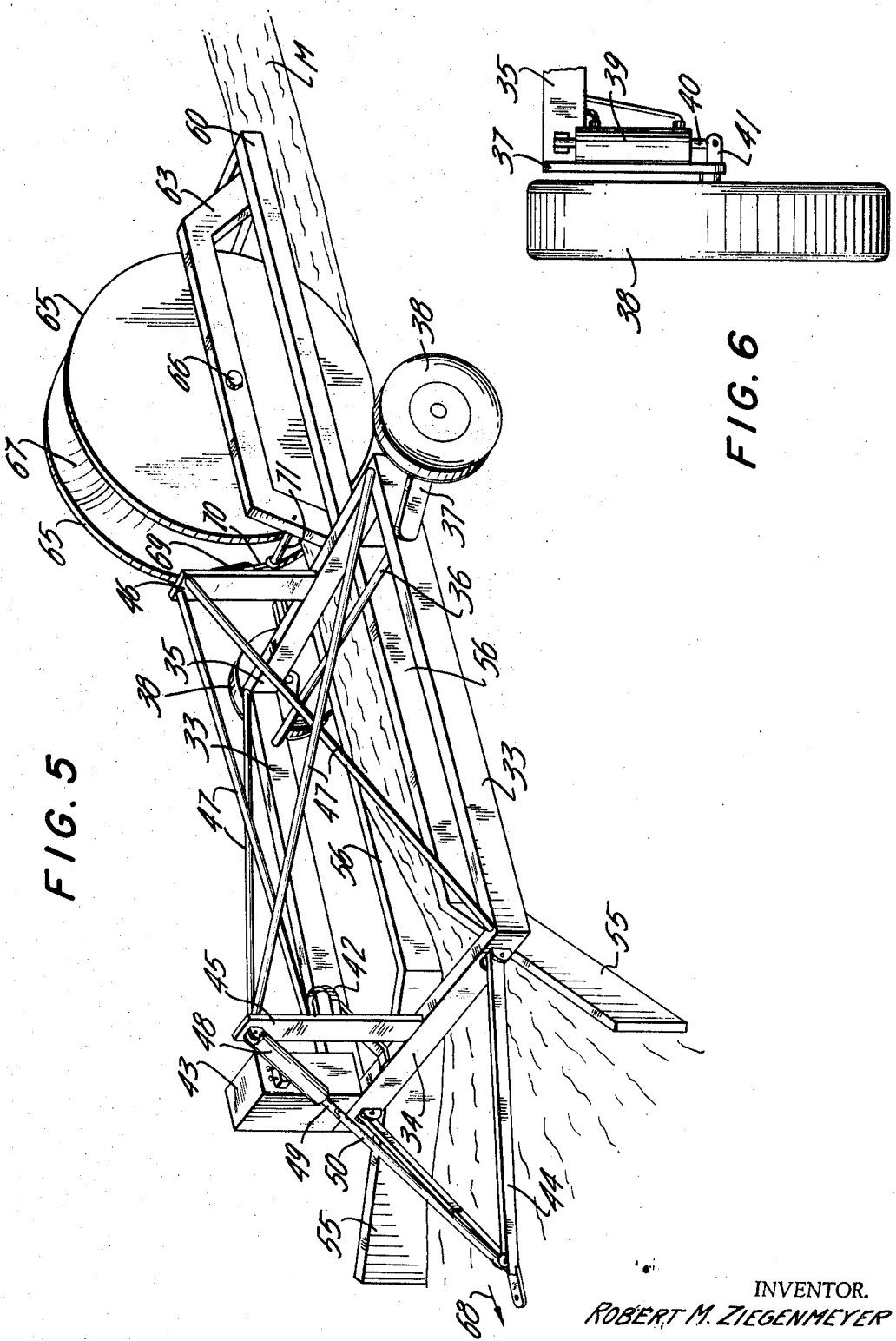

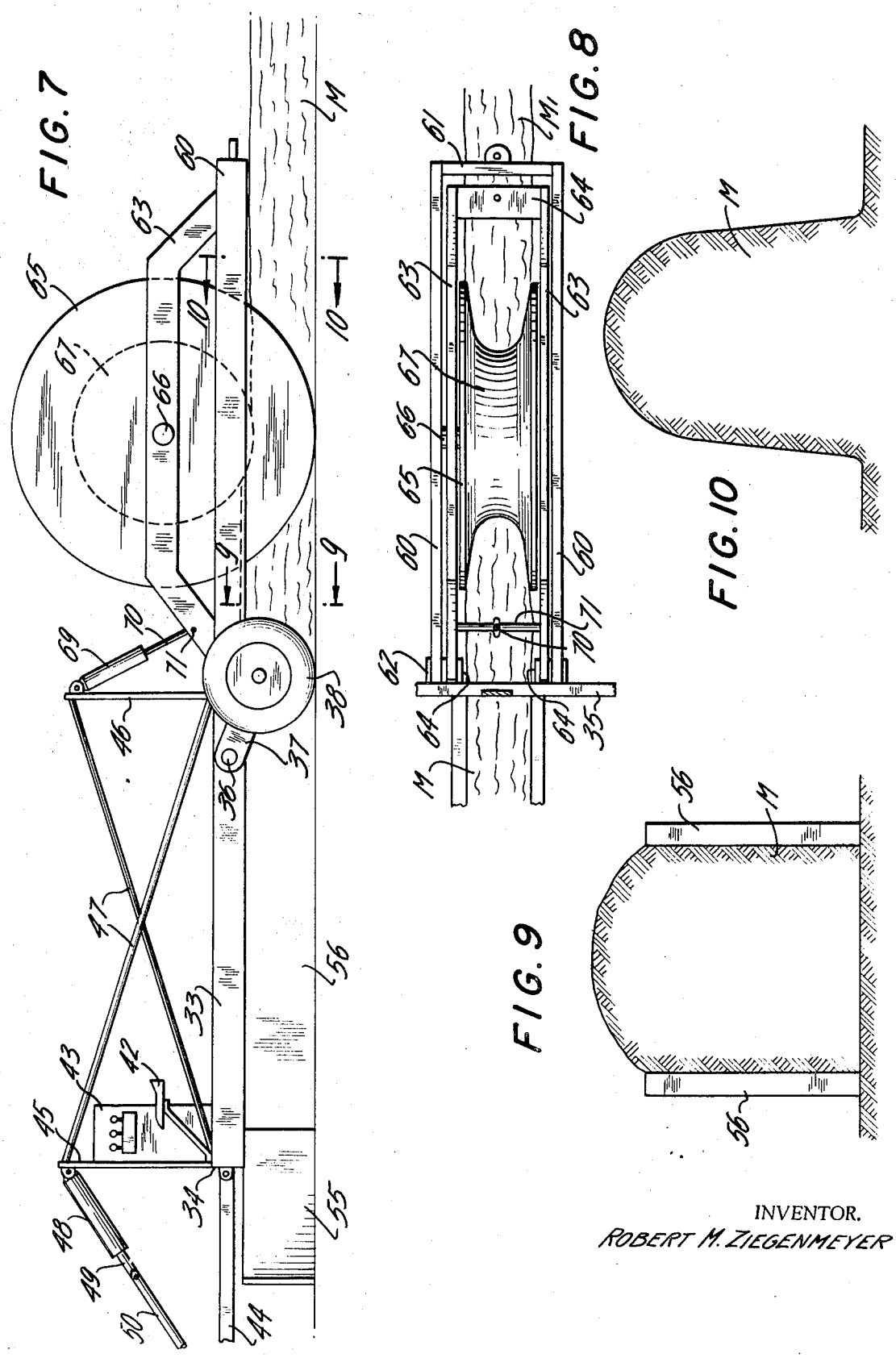

March 9, 1971 R. M. ZIEGENMEYER 3,568,453
APPARATUS FOR FORMING DIKES
Original Filed Feb. 2, 1965 5 Sheets-Sheet 5
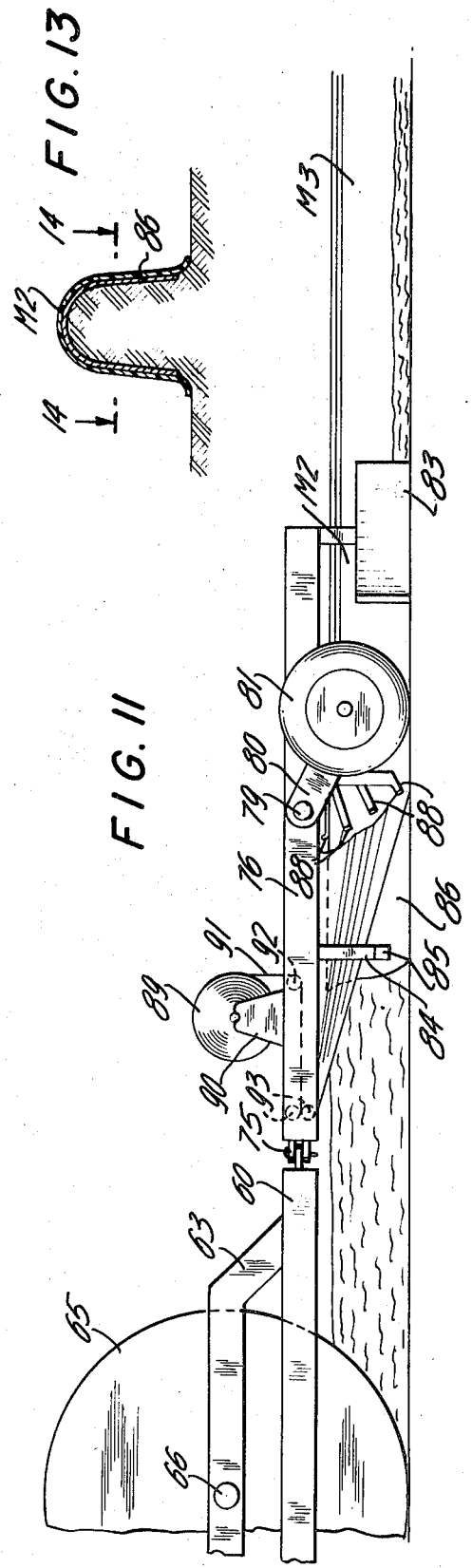
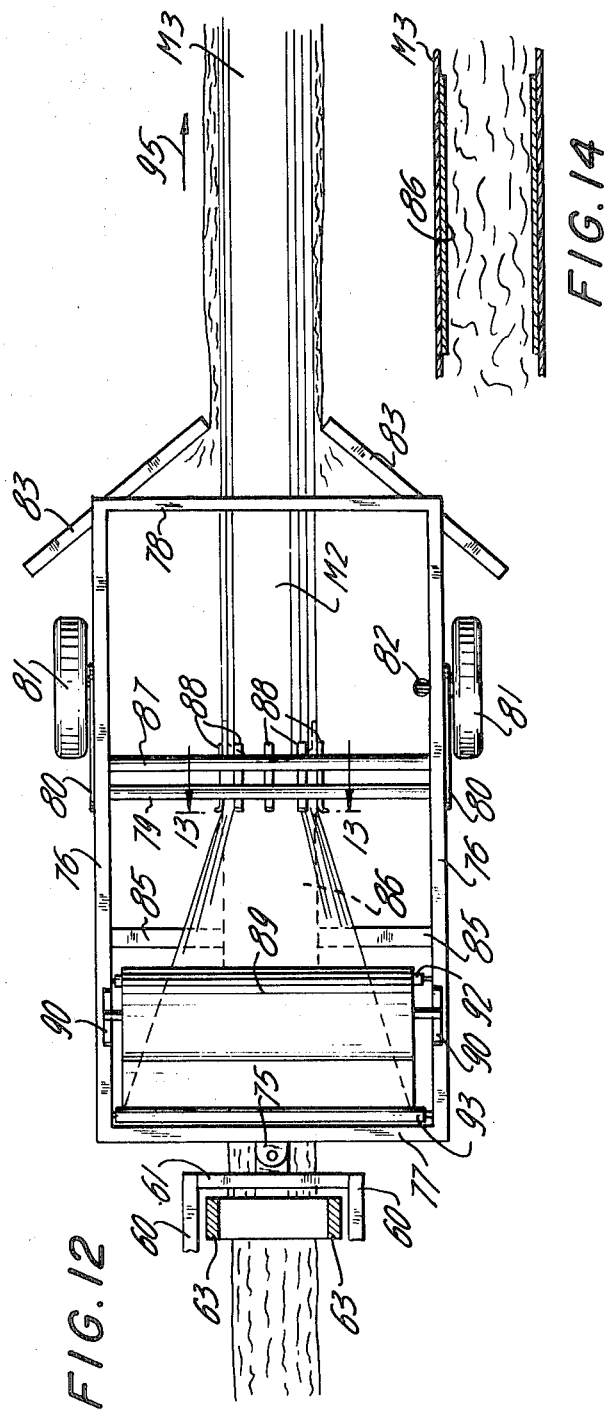
INVENTOR.
ROBERT M. ZIEGENMEYER United States Patent Office 3,568,453
Patented Mar. 9, 1971

3,568,453
APPARATUS FOR FORMING DIKES
Robert M. Ziegenmeyer, Sutter, Calif., assignor to Dart Industries Inc.
Original application Feb. 2, 1965, Ser. No. 429,738, now Patent No. 3,415,062, dated Dec. 10, 1968. Divided and this application Sept. 23, 1968, Ser. No. 810,406
Int. Cl. A01b 13/07; E02b 7/06; E02d 17/00
U.S. Cl. 61—63
9 Claims

ABSTRACT OF THE DISCLOSURE

The present invention relates to an apparatus for forming barriers for impounding water for use in diking rice fields or the like comprising a vehicle provided with means for gathering earth for a limited area along both sides of a desired path, forming the gathered earth into a mound of the desired height, width and shape, covering the formed mound with plastic to prevent weed growth and erosion and embedding the film in the earth to prevent accidental removal of the plastic from the mound.

This application is a division of application Ser. No. 429,738 filed Feb. 2, 1965 and now Pat. No. 3,415,062.

In the growing of certain grains, particularly rice, it is common practice to erect an earthen barrier around the periphery of the field in which the grain is raised for the purpose of impounding water for the growing of the grain. Particularly in the United States, the government places restrictions upon the acreage which may be devoted to the raising of rice and therefore it is desirable to increase the productivity of the acreage as much as possible. In the use of earthen barriers or dikes around the periphery of the field it has been found that the productivity of the enclosed acreage is reduced. The major reason of this reduction of productivity is that in forming the earthen dike it is necessary to gather earth from both sides of the path of the earthen dike to form the dike, (earth is removed from an area between 8 and 10 feet on each side of the dike) thereby increasing the ultimate water depth in these areas and decreasing productivity. Also, the earthen dike is betwen 30 inches and 38 inches in height, depending upon the soil conditions, which heights determines the angle of repose of the earth when formed into a dike, wind conditions in the particular area and the like. The dike of the present invention is much smaller, thereby minimizing the quantity of earth which must be gathered from the area adjacent the dike. It is desirable to form an effective periphery dike which does not utilize much earth in the construction thereof, thereby reducing the amount of earth which must be removed from the growing field, as removing large amounts materially increases the weed control problem in the area of the dike. The removal of less earth permits the grain production in the area adjacent the dike.

Rodent control in a typical rice field is very difficult and the rodents have a tendency to burrow into the earthen dikes thereby creating openings through which the impounded water can flow which ultimately results in dike erosion to the point that the dike must be manually repaired at substantial expense. Thus, it is desirable to develop a dike which resists the tendency of the rodents to burrow therein. The dike of the present invention is covered with plastic sheeting thereby maintaining the earthen portion of the dike in a constant wet condition. The rodents prefer dry earth for burrowing and thus do not damage the present dike as readily as the known earthen dikes.

The present invention is directed to an apparatus for erecting a dike or water barrier. The dike is an earthen dike covered with a flexible film material. It has been found that the dike not only does not exceed 14 inches in height (in contrast with the prior dikes made wholly from earth which are from 30 to 38 inches in height) and requires a smaller amount of earth to be gathered from each side of the dike during formation, but also limits this digging area to about 4 feet of each side of the dike, rather than the 8 feet normally used in forming earthen dikes.

The dike or barrier permits the growth of rice up to a point adjacent to the dike since the film material covering the dike does not permit sunlight to enter into the area of earth below the covering material and no weeds and the like can grow effectively on the dike. Weeds grow effectively on the known earthen dikes and spread rapidly throughout the rice field due to the cycling of the plant through the seed stage and the germination stage. Thus, if the dike is covered with a plastic material, such as the present invention, which prevents the germination of the seeds, it has been found that the rice field population of weeds is materially reduced thereby more effectively growing rice in the areas immediately adjacent the dikes and permitting a more effective utilization of fertilizer and acreage in the field for the production of rice. Large stands of water grass and other weeds in the area of the dikes make such areas useless for raising rice since effective harvesting of such areas have been impossible or very difficult. In the utilization of dikes according to the present invention it has been found that the weed control is a progressive matter increasing an effectiveness year after year. Thus, during a first growing season the weeds are reduced in number due to the plastic dike cover, thereby reducing the amount of seed which is available for germination the following year and this cycle of reducing the seed quantity is progressively increased each year until within about three years the quantity of weeds in the vicinity of the dike is practically non-existent.

The apparatus according to the present invention is simple, effective and durable. It is extremely important in farm equipment that the apparatus be durable and can withstand utilization in an area which is dusty such as in a common rice field area. It is also important that the apparatus be simple in operation since complex apparatuses are not practical for farmers. Frequently, the help on a farm is unskilled and thus the equipment must be designed for utilization by people of limted training.

The apparatus of the present invention is low in initial capital investment and low in operating cost and permits the utilization of a conventional farm tractor for operating the equipment and erecting the dikes.

The drawings illustrate the present preferred embodiment of the invention in which:

FIG. 3 is a vertical cross-section similar to FIG. 2 showing a first modified form of a dike or barrier according to the present invention;

FIG. 4 is a view similar to FIG. 3 showing a second modified form of the dike or barrier according to the present invention;

FIG. 5 is a perspective view of a front portion of an apparatus made according to the present invention;

FIG. 6 is a view taken on FIG. 5 in the direction of arrow 6;

FIG. 7 is a side elevation view of the apparatus of FIG. 5;

FIG. 8 is a top plan view of a portion of the apparatus for FIG. 7;

FIG. 9 is a cross-section taken on line 9—9 of FIG. 7;

FIG. 10 is a cross-section taken on line 10—10 of FIG. 7;

FIG. 11 is a side elevation view of the rear portion of the apparatus according to the present invention;

FIG. 12 is a top plan view of the apparatus shown in FIG. 11;

FIG. 13 is a cross-section taken on line 13—13 of FIG. 12; and,

FIG. 14 is a cross-section taken on line 14—14 of FIG. 13.

The plastic film or sheet used in the present invention is about 58 inches in width and extends down the sides of the earthen mound such that the lower longitudinal edges of the film are embedded in the earth on each side of the earthen mound. Ideally, the edges are embedded a minimum of 5 inches below the normal ground level grade. The film should be tight against the earthen mound to prevent the wind from flapping the film thereby working the longitudinal edges loose and destroying the covered dike. Preferably, it is desirable to periodically perforate the film at its upper extremity along the length of the dike to avoid any air pressure to build up in the dike as the water level rises during filling of the rice field. Although varying with conditions, it is preferable to have the earthen mound between 10 and 20 inches in height and the ideal height is about 14 inches.

The method according to the present invention is directed to the steps of (1) forming an earthen mound along a desired path in a field and (2) covering the mound with a plastic film material. Preferably, the longitudinal edges of the film material are embeded in the earthen mound or in the earth adjacent the earthen mound.

In forming the earthen dike according to the present invention it is desirable to maintain a substantially constant upper level on the dike and for this reason a method has been devised whereby the earthen mound is consolidated by utilization of a folding force which tends to evenly consolidate the earthen material without varying the upper level of the earthen material.

The apparatus according to the present invention includes a vehicle provided with: (1) means for forming the earthen mound along a desired path in the field, and (2) means related to the first means for covering the mound with plastic film. A third means can be included on the apparatus to embed the longitudinal edges of the film in the earthen mound or adjacent to the mound. The apparatus in its preferred form includes a roller having a peripheral groove with height and width dimensions approximating the dimensions of the consolidated earthen mound. The roller is mounted for pivotal vertical movement (or can be mounted for a vertical movement against biasing means such as springs or the like) to provide a floating force for consolidating the earthen mound in a manner previously described.

Figure 1:
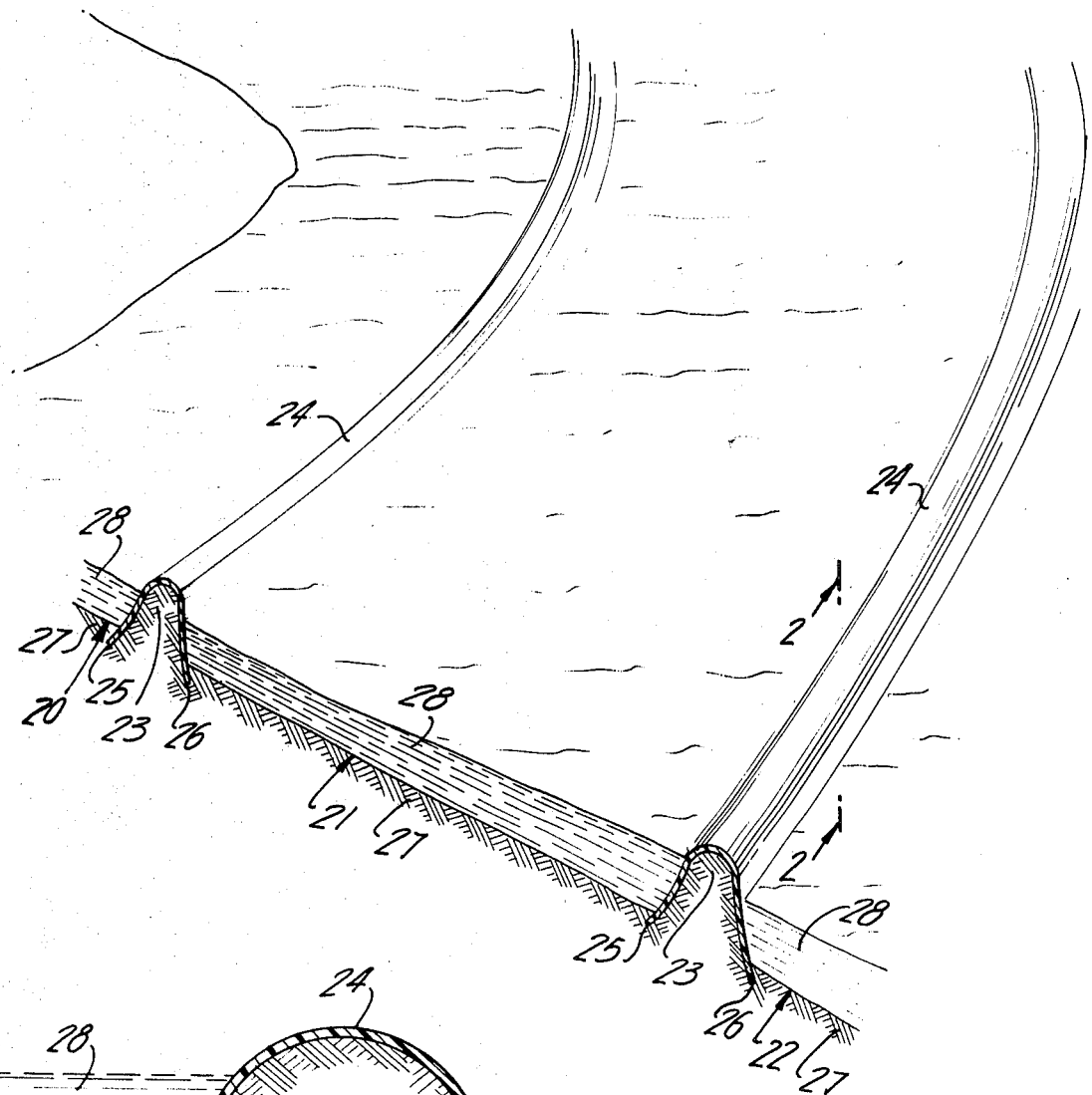
FIG. 1 is a perspective, partly in vertical cross-section of a field with dikes or barriers made according to the present invention.
Figure 2:
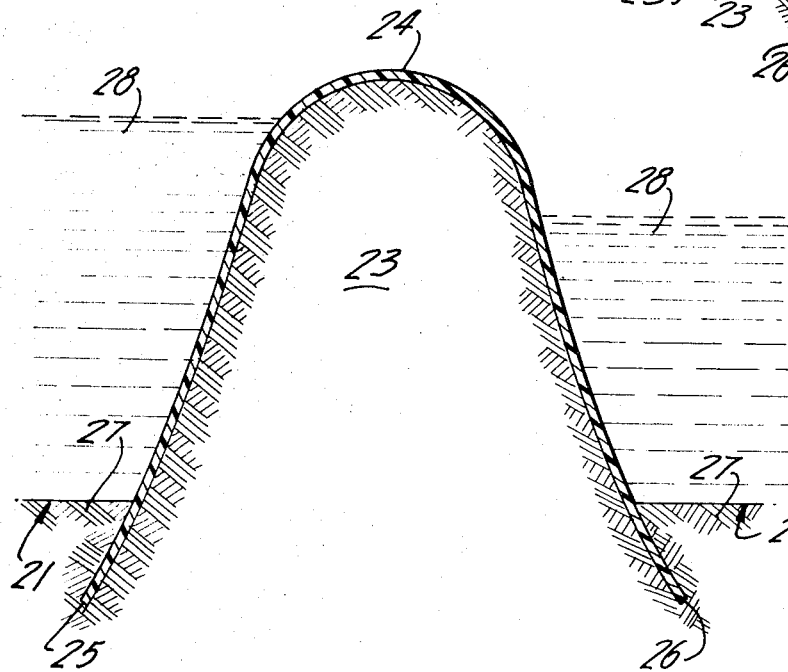
FIG. 2 is a cross-section taken on line 2—2 of FIG. 1.

As shown specifically in FIGS. 1 and 2, the field is generally terraced at various grade levels such as 20, 21 and 22. It is desirable to erect barriers between these various terrace levels to insure that the water impounded at the various levels will be of substantially equal depth which insures maximum rice production per acre. A consolidated earthen mound 23 is erected between each terrace level and a continuous plastic film or sheet 24 is positioned over and in contact with the consolidated earthen mound 23 and the lower longitudinal edges 25 and 26 are embedded in the earth 27 immediately adjacent the earth dike. Subsequently, the field is flooded with water 28 to a desired depth to provide the growing area.

Fields, which are level do not require terracing, but frequently the practice is to provide dikes or barriers across the field (frequently called "cross checks") to prevent the movement of the water in the field to one end of the field in the event of wind blowing the length of the field. Such wind frequently piles the water up at one end of the field while leaving the other end of the field practically dry. There are critical periods in the growing of rice when the absence of water overlying the rice would result in substantial impairment of the rice crop. Thus, the cross checks prevent the movement of the water to one end of the field.

FIG. 4 illustrates a second modified form of the dike in which the dikes has lower longitudinal edges 32 which are embedded in the earthen dike 31. The configurations of FIGS. 3 and 4 minimize the quantity of plastic material utilized in the barrier-forming operation and therefore reduce the cost of forming such barriers.

Referring to FIGS. 5 through 10, the apparatus according to the present invention includes a rigid, horizontal extending rectangular frame having side members 33, a front member 34, and rear member 35. A rigid rotatably mounted bar 36 extends cross-wise of the frame and through the side members 33. Each outer extremity of the bar 36 is affixed to an arm 37 on each side of the vehicle and the lower end of the arm has a rotatable wheel 38 affixed thereto. A hydraulic cylinder 39 is pivotally mounted to the end member 35 (see FIG. 6) and a rigid rod 40 extending therefrom is pivotally mounted to the lower end of arm 37 by a clevis 41. The hydraulic cylinder is suitably actuated by controlled pressurized fluid to swingably raise and lower the arm 37 which in turn rotates the bar 36 and the arm 37 on the other side of the frame. The wheels 38 on each side of the vehicle are also moved in unison upwardly and downwardly with the arms 37 to raise and lower the frame.

A seat 42 is provided for the operator of the equipment within reach of suitable controls 43 and a compressor and pump for supplying pressurized hydraulic fluid to the various hydraulic cylinders of the apparatus.

A pull bar 44 is pivotally mounted to the front member 34 of the frame for connection to a conventional farm tractor of sufficient power to move the apparatus described herein. Vertically extending support bars 45 and 46 are affixed upright from the front and back members 34 and 35 respectively. Rigidifying bars 47 extend across the frame to give sufficient rigidity thereto and are affixed to the frame and to the upper ends of support bars 45 and 46. A hydraulic cylinder 48 is pivotally mounted to the upper extremity of bar 45 and has a piston rod 49 extending downwardly and outwardly therefrom. The lower end of the piston rod 49 is pivotally mounted to a connector bar 50 which in turn is connected pivotally at its lower end to the pull bar 44. Since the front of the pull bar 44 cannot move vertically relative to the tractor, upon activation of the cylinder 48 the front end of the frame is raised and lowered as desired. Suitable hydraulic connection, valves and controls are provided for the cylinder 48. A pair of scraper blades 55 are affixed to the underside of the frame and each extends obliquely outwardly and forwardly from the frame and path among which the earthen mound is to be erected. A pair of substantially parallel blades 56 are affixed to the underside of the frame and to the innermost ends of the oblique blades 55. Thus, the dirt or earth is gathered by the blades 55 from an area extending about 4 feet on each side of the mound path and is tunneled into a mound forming chamber between the plates 56. The inner edges of the blades 55 define a throat (see FIG. 9) through which the gathered earth passes to form the mound between plates 56 an the apparatus moves in the direction of arrow 68 in FIG. 5.

Affixed to the rear face of the frame, and specifically to member 35, is a U-shaped frame (see FIG. 8) having side members 60 and a rear end member 61. The forward ends of side member 60 are affixed to the plate 35 by clevices 62 permitting vertical swinging movement of the members 61 about and relative to the member 35. The members 60 and 61 enclose the roller to be described and function as a connector unit for a film-feeding portion of the apparatus to be described hereinafter.

A second frame is positioned inside the members 60 and 61, and has side members 63 and in integral rear cross member 64. The forward ends of members 63 are pivotally mounted to the member 35 by clevises 64 thereby permitting vertical swinging movement of members 63 relative to member 35. A large roller 65 is rotatably mounted on an axle 66 mounted crosswise in the members 63. The roller 65 has a large continuous peripheral groove 67 defining the approximate shape of the earthen mound desired for formation of the barrier. Thus as the vehicle is moving in a forward direction as shown by the arrow 68 in FIG. 6, the roller 65 is positioned over the earthen mound M (formed by plates 55 and 56) to consolidate the mound to the configuration shown in FIG. 10. A hydraulic cylinder 69 (see FIGS. 5 and 7) pivotally mounted to a cross bar 71 affixed between the members 63. Suitable sources of pressurized hydraulic fluid and controls therefor are provided for cylinder 69. Upon activation of piston rod 70, an upward movement of the piston rod 70, roller 65 and members 63 and 64 is effected to bring the roller out of engagement with the earthen mound and to an elevated travel position for moving the apparatus along a highway, etc.

In normal operation the piston rod 70 is freely movable in the cylinder 69 thereby permitting a vertical swinging movement of members 63, 64 and roller 65. This allows the roller 65 to consolidate the earthen mound M due to weight of the roller while maintaining the height of the mound substantially level. Thus, the roller 65 provides a floating force for consolidating the earthen mound, thereby insuring a uniform consolidation and density in the mound M. The roller 65 may be filled partly or entirely with water to increase its weight if soil conditions dictate an increased consolidating force.

The member 61 of the inside roller frame has a clevise connector 75 for pivotally affixing this frame to a rear frame having side members 76, a front member 77 and a rear member 78. This rear frame is a rigid, substantially rectangular configuration and has a transversely extending shaft 79 passing through and rotatable in openings in the side members 76. Each end of the shaft 79 has an integral arm 80 supporting rotatable wheels 81 at the lower end of each arm 80.

A hydraulic piston cylinder and assembly 82 (similar to that shown in FIG. 6) is connected between the frame side member 76 and the arm 80, and upon activation of the assembly, the arms 80 are raised and lowered simultaneously by rotation of the shaft 79 in the same manner as the wheels on the front frame are raised and lowered by piston 40 and cylinder 39. The purpose of raising and lowering the wheels on the front frame is to raise and lower the digging plates 55 and on the back frame to raise and lower back-fill plates 83 (to be described hereinafter).

A downwardly extending bar 84 is integrally fixed to each side member 76 and has a transversely inwardly extending bar 85 affixed to each lower end thereof. The innermost end of each bar 85 is affixed to tunnel 86 (see FIGS. 13 and 14) through which the consolidated earthen mound M passes during the forward movement of the vehicle. The tunnel 86 is an inverted U-shape with the open side of the U facing downwardly. The tunnel tapers inwardly slightly from front to back so that the passage of the mound through the tunnel effects a slight surface consolidation of mound M by pressing inwardly and downwardly. Stated in another way, the U-shape of the tunnel decreases in cross section as the tunnel progresses from front to rear.

A pair of cross-bars 87 are provided in the mid-point of the rear frame and extends transversely between and are fixed to the side members 76. The bars 87 support a plurality of hold-down bars 88 positioned around the outside of the tunnel 86 and slightly spaced from the tunnel at a distance sufficient to permit passage of plastic film between the hold-down bars 88 and the outer face of the tunnel 86.

A roll of plastic film 89 (preferably polyethylene of 4 mm. thickness) is supported above the frame by a central axle rotatably mounted in brackets 90 and feeds a continuous single sheet of film 91 downwardly under a roller 92 rotatably mounted in the frame and forwardly between a pair of tension rollers 93 (rotatably mounted in the frame) and then rearwardly and downwardly toward the tunnel 86 and under the hold-down bars 88 to a position overlying the consolidated earthen mound M2 to form a consolidated earthen mound covered with plastic film and generally designated M3. As the apparatus moves forward the plastic covered earthen mound moves out of the rear of the vehicle as shown in FIGS. 11 and 12 in the direction of the arrow 95.

A pair of back-filling plates 83 are integral on the underside of the rear frame and specifically with side members 76 and end members 78, and are disposed in an oblique angle to the barrier path. Plates 83 gather earth from adjacent the dike path for filling in along the longitudinal side edges of the plastic film and specifically fill in the areas 27 as shown in FIG. 2. Thus, the plastic covered earthern mound is completed with the side edges embedded in the earth to prevent the side edges from working loose due to wind or water engagement. The plates 83 may be raised and lowered by piston and cylinder 82 and operating wheels 81 vertically.

The plastic film 91 is fed automatically onto the earthen mound by the forward movement of the vehicle. At start up, the film is threaded around the rollers and under bars 88 in the manner shown, and pulled rearwardly and outwardly of the vehicle and anchored to the earth.

A present preferred embodiment of the invention has been described herein, but it may be otherwise embodied within the scope of the following claims.

I claim:
1. An apparatus for erecting barriers for impounding water, comprising:
  (a) a vehicle movable along a desired path in an earth field to erect a barrier along said path;
  (b) plates extending outwardly from the front of the vehicle to gather earth from the field on each side of the path, said plates extending inwardly, obliquely toward said path whereby the gathered earth moves toward the path;
  (c) said plates being separated from each other at their innermost ends to provide a throat, so that the gathered earth forms a mound in passing through the throat;
  (d) a roller, mounted on said vehicle behind said plates, and rotatable about an axis extending crosswise to the direction of forward movement of the vehicle, said roller having a continuous peripheral groove of a depth and width defining the dimensions of a consolidated earth mound formed at said throat, during forward movement of the vehicle to consolidate the earth mound by exerting a pressure thereon;
  (e) a roll of plastic film, rotatably mounted on the vehicle behind said roller, to feed a sheet of plastic film over said consolidated earth mound behind the roller, said film having longitudinal edges positioned at the lower sides of the consolidated earth mound; and,
  (f) back-fill plates mounted of said vehicle behind said roll of film, said plates being adapted to gather earth from the field and move the earth toward said path to embed the longitudinal edges of the film in the earth.

2. An apparatus according to claim 1 wherein:
said roller axis is pivotally mounted on said vehicle so that the axis and roller may move vertically substantially normal to the earth.

3. An apparatus according to claim 1 wherein:
said consolidated earth mound is further consolidated by moving through a tunnel affixed to the vehicle behind said roller, said tunnel being generally U-shaped with the "U" opening toward the earth and the U-shape decreasing in size from front to rear.

4. An apparatus for forming barriers for impounding water comprising: a vehicle provided with
(a) plates extending therefrom, said plates being positioned for gathering earth simultaneously from two sides of a desired path and for passing the gathered earth into a throat located between the plates;
(b) first means, operatively related to said plates for compressing and forming the gathered earth into an earthen mound of the desired height, width and shape, said first means comprising a roller mounted behind said plates and rotatable about an axis extending crosswise to the direction of forward movement of the vehicle, said roller having a continuous peripheral groove of a depth and width defining the dimensions of the formed earthen mound, said roller compressing the earthen mound into the desired height, and width by exerting pressure thereon;
(c) second means, operatively related to said plates and said first means, for covering the formed earthen mound with a plastic film.

5. An apparatus as claimed in claim 4 wherein said second means comprises a roll of plastic material rotatably mounted on said vehicle behind said roller, to feed a sheet of plastic material over said mound.

6. An apparatus according to claim 4 including third means operatively related to said plates and said first and second means to embed longitudinal edges of the film in the earthen mound.

7. An apparatus according to claim 4 including third means operatively related to said plates and said first and second means to embed longitudinal edges of film in the earth adjacent to the earthen mound.

8. An apparatus according to claim 5 including third means operatively related to said plates and said first and second means to embed longitudinal edges of the film in the earthen mound.

9. An apparatus according to claim 5 including third means operatively related to said plates and said first and second means to embed longitudinal edges of film in the earth adjacent to the earthen mound.

References Cited
UNITED STATES PATENTS

| | | | |
|---|---|---|---|
| 1,763,789 | 6/1930 | Judy | 47—9 |
| 3,005,425 | 10/1961 | Saifuku | 47—9X |
| 3,121,973 | 2/1964 | Phillips et al. | 172—701X |
| 3,180,290 | 4/1965 | Kappelmann et al. | 47—9X |
| 3,184,889 | 5/1965 | Gray et al. | 172—701X |
| 3,234,741 | 2/1966 | Ionides | 61—7 |
| Re. 25,439 | 9/1963 | Mostrong | 172—252 |

JACOB SHAPIRO, Primary Examiner

U.S. Cl. X.R.

61—7, 30, 72.1, 72.6; 47—9; 172—176, 252, 701